UNITED STATES PATENT OFFICE.

ERNST A. BOEHNE, OF ST. LOUIS, MISSOURI.

IMPROVEMENT IN MANUFACTURING WHITE LEAD.

Specification forming part of Letters Patent No. 142,199, dated August 26, 1873; application filed April 12, 1873.

*To all whom it may concern:*

Be it known that I, ERNST A. BOEHNE, of St. Louis, in the county of St. Louis and State of Missouri, have invented an Improved Process of Manufacturing White Lead, of which the following is a specification:

This invention relates to that class of processes employed for corroding and making white lead.

In order to achieve the essential qualities and effects of white-lead, such as body, pure color, and durability, my invention can be stated to consist, first, in reducing the pig-lead to granulated lead, in order from same to carry on the process of forming acetate of lead; secondly, to the peculiar process of adding to the acetate of lead, at one and the same time, separately, oil of vitriol, sal-soda, and ammonia, in their proper proportions, to produce white lead, all of which will now more fully appear.

In carrying out my invention, take pig-lead and melt it; pour it through a fine sieve into a tank containing water, taking care to prevent the water from getting warm, thus reducing the lead to a granulated state, in which condition it can be better dissolved by the acetic acid and acted upon by the atmosphere. I then place one thousand pounds of the granulated lead into a screen or sieve, made entirely of wood, of the following dimensions: Fourteen feet two inches long, five feet five inches wide, and four and one-fourth inches deep. Beneath this screen or sieve I place a tray, made entirely of wood, of the following dimensions: Fourteen feet three inches long, five feet six inches wide, and seven and one-half inches deep, this tray containing one thousand pounds of acetic acid. I then lower the screen or sieve containing the granulated lead into the tray containing the acetic acid, allowing it to remain there for two hours. Then, by means of a lever, I raise the screen or sieve of granulated lead out of the tray of acetic acid, allowing it to remain exposed to the atmosphere for two hours. The above operation is continued for eighteen hours. At the expiration of that time the liquid will be found to contain from thirty to forty per cent. of lead. The acetate of lead I next place in a wooden tank, and, after determining the percentage of lead contained in the liquid, I add to every one hundred pounds of lead twenty pounds oil of vitriol of sixty-six degrees strength, twenty-four pounds of sal-soda, containing not more than forty-five per cent. of water, and one pound of carbonate of ammonia containing not more than twelve per cent. of water, the sal-soda and ammonia to be liquefied. The oil of vitriol, sal-soda, and ammonia are added to the liquid containing the lead, separately, at one and the same time. I then allow the lead to settle. After it has settled I draw off the acetic acid and use it again for the same process. After the acetic acid has been drawn off the lead I wash the lead with clear water and free it from all impurities. After it is thoroughly washed I place the lead on copper pans, which are heated by steam, and dry it.

I claim—

1. Pig-lead converted into a granular state to produce the acetate of lead herein described, and for the purpose set forth.

2. Combining with the acetate of lead at one and the same time oil of vitriol, sal-soda, and ammonia, as and for the purpose set forth.

In testimony of said invention I have hereunto set my hand.

ERNST A. BOEHNE.

Witnesses:
WILLIAM W. HERTHEL,
REUBEN A. WARNER.